Aug. 10, 1926.  1,595,268
O. W. VAN PETTEN ET AL
GAS SEPARATOR
Filed June 9, 1925
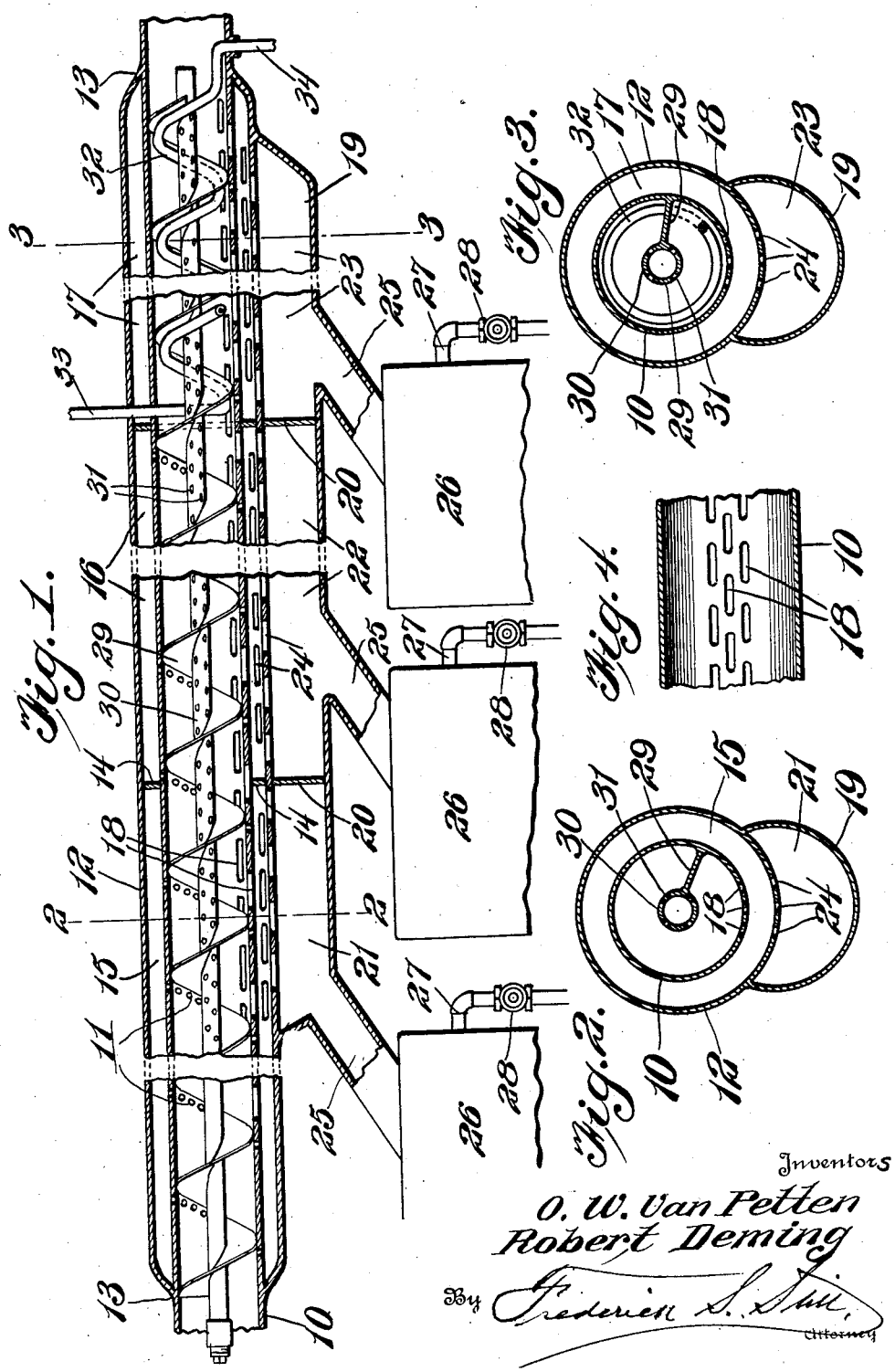

Patented Aug. 10, 1926.

1,595,268

UNITED STATES PATENT OFFICE.

OLIVER W. VAN PETTEN AND ROBERT DEMING, OF PRESTONSBURG, KENTUCKY.

GAS SEPARATOR.

Application filed June 9, 1925. Serial No. 35,965.

This invention relates to gas separators and more particularly to a gas separator capable of use either for separating the gas into its various constituents as respects density or for separating from the gas liquids and foreign matter suspended therein.

Another object of the invention is to produce a device of this character employing the velocity and pressure of the gas as a means for effecting the separation.

More specifically, the invention relates to a separator in which means are provided for causing the gas to move in a spiral path and utilizing the centrifugal force thus set up to cause separation from the gas of fluids or foreign matter contained therein or to cause separation of the gas into its various constituents as respects density.

A still further object of the invention is to provide a device of this character including means whereby the gases during any portion of their passage through the separator may be subjected to a change in temperature, thereby causing, if the temperature be raised, a more complete volatilization of the lighter elements contained in the gas and, if the temperature be lowered, a removal from the gas by condensation of elements which would not ordinarily be removed therefrom.

The invention further resides in the arrangement and construction of the various parts of the separator, as shown in the accompanying drawings, wherein:—

Figure 1 is a longitudinal sectional view through a gas separating apparatus constructed in accordance with our invention;

Figure 2 is a section on the line 2—2 of Figure 1;

Figure 3 is a section on the line 3—3 of Figure 1; and

Figure 4 is a fragmentary sectional view taken longitudinally of the line pipe and showing the manner of forming openings 18 therein.

Referring now more particularly to the drawings, the numeral 10 indicates a line pipe for the passage of gas a portion of which in accordance with our invention is provided with a spirally arranged series of openings 11. That portion of the line pipe having the openings 11 therein is surrounded in spaced relation thereto by a jacket 12, the ends of which are sealed to the line pipe, as indicated at 13. The space between the line pipe and the jacket is subdivided by partitions 14 to form in such space a plurality of chambers 15, 16 and 17. The bottom wall of the line pipe within each chamber is provided with a plurality of longitudinally spaced longitudinally extending slots 18 placing the interior of the line pipe in communication with the chamber and providing an additive communication to that established by the openings 11, hereinbefore referred to. These slots are arranged in series, the slots of each series being arranged longitudinally of the line pipe, the slots of adjacent series being staggered with relation to the slots of the next adjacent series and being of such length that they overlap adjacent slots of the next adjacent series.

To the under surface of the reservoir is secured a collection chamber 19 having partitions 20 corresponding to the partitions 14 and forming within this collection chamber a plurality of lesser chambers 21, 22 and 23 corresponding to the chambers 15, 16 and 17, and in communication with these chambers by longitudinally extending longitudinally spaced slots 24 formed in the bottom wall of the jacket. These slots are likewise arranged in series and are constructed after the manner of the slots 18 of the line pipe, hereinbefore referred to. Each chamber 21, 22 and 23 has an outlet 25 leading to a storage reservoir, generally designated at 26, one reservoir being provided for each chamber. Each reservoir is provided with an outlet 27 having arranged therein a valve 28.

Within the line pipe, means are provided for causing the gases passing through the line pipe to be thrown against the outer wall of the line pipe and to travel longitudinally of the line pipe upon a spiral path corresponding to be spiral series of openings 11 and in as close proximity to these openings as is possible. In the present instance, this means is shown as comprising a spiral baffle 29, the inner edges of the vanes of which are preferably secured to a tubular shaft 30 and the outer edges of the vanes of which are continuously connected with the inner face of the wall of the line pipe either by welding or otherwise securing the same thereto so that a perfect seal is provided between the wall and the vanes. The vane of the worm is attached to the wall at the far side of the line of openings from the inlet end of the device and as close to the edges of these openings as is practical. The inlet end of the hollow shaft is sealed but at a point spaced from this inlet end the hollow shaft is provided with openings 31 through which a portion of the gas may pass. In a portion of the line pipe lying within the chamber 17, the line pipe has arranged therein a coil 32, this coil being spirally formed to correspond to the spiral of the worm and being arranged at the front face of the worm but slightly spaced therefrom and slightly spaced from the wall of the line pipe. The terminals of this coil, indicated at 33 and 34, may be connected with any suitable source of heating or cooling medium.

In the operation of the device, the gas entering the inlet end of the device is caused by the worm to assume a spiral path and its speed will cause the heavier portions of the gas to swing outwardly against the walls of the line pipe and to move in the angle between the vane and the line pipe. At this point, the heavier particles will be engaged against the walls and coming into contact therewith will cling to the walls but will be shifted continuously by the passing gas so that they are continuously moving through the openings 11. After passing through these openings, they will move downwardly about the outer surface of the pipe by gravity and come to rest in a chamber 21, 22 or 23. The centrifugal action of the gases furthermore cause them to sweep over the series of slots 18 and through these slots portions of the fluids and gases in proportion to their density will pass to the chambers 21, 22 and 23. Since the heavier particles will be those first to engage the walls of the line pipe, it will follow that the heavier particles will collect in the chamber 15, a lighter group of particles will collect in the chamber 16 while the lightest collected group will collect in the chamber 17. The series of openings in the hollow shaft, by reducing the velocity of the gas, reduces its ability to support and carry with it such lighter particles with the result that they are deposited upon the walls in turn. Within the chamber 17, if refrigeration be applied to the gas, this will tend to condense those particles which ordinarily would pass on with the gas and remain in a volatile state. If a heating fluid be passed through the coil, some volatile elements contained within the gas will be completely volatilized so that they may properly intermingle with the gas. The material collected in the chambers 15, 16 and 17 will pass through the slots 24 to the chambers 21, 22 and 23 and finally to the storage reservoirs of these chambers. If the valves 28 be open so that the gases may pass through the reservoirs 26 and be conducted away for use, it will be obvious that the heavier gases will pass out into the chambers 15 and 21, a lighter series of gas will pass out into the chambers 16, 22 and a still lighter series of gases will pass out into the chambers 17, 23, leaving only very light gases to pass on through the line pipe. Obviously, the gases thus separated may be separately treated for extraction of values therefrom if this is found desirable.

It will be obvious that a structure such as above set forth is capable of a considerable range of change and modification as for example, if refrigeration of the gases during a portion of their travel is to be employed consistently. Obviously, that method of refrigeration by expansion of the gases themselves might be resorted to. Furthermore, while the coil has been illustrated and referred to as restricted to that portion of the line pipe lying within the chamber 17, this coil might obviously be extended through the entire jacketed section of the line pipe if it is found desirable or might be arranged within any of the various sections of the line pipe as is found desirable. It will also be obvious that while the structure hereinbefore illustrated is intended primarily for the separation of liquids and semi-liquids from natural gas, it might by a very slight modification be adapted for the separation of liquids and semi-liquids from other gases or fluids such as steam and we accordingly do not limit ourselves to the specific arrangement hereinbefore set forth except as hereinafter claimed.

We claim:—

1. A gas separator comprising a conduit for the passage of gas having a section thereof jacketed, said jacketed section of the conduit being provided with a spirally extending series of openings, means for causing gas passing through said jacketed section of the conduit to move in contact with the walls of the conduit at said openings, the space between said jacket and conduit being subdivided by partitions spaced longitudinally of the conduit into a plurality of chambers and an outlet communicating with each chamber.

2. A gas separator comprising a conduit for the passage of gas having a section thereof jacketed, said jacketed section of the conduit being provided with a spirally extending series of openings, means for causing gas passing through said jacketed section of the conduit to move in contact with the walls of the conduit at said openings, the space between said jacket and conduit being subdivided by partitions spaced longitudinally of the conduit into a plurality of chambers and an outlet communicating with each chamber, the bottom wall of the conduit of each chamber having a plurality of longitudinally spaced longitudinally extending openings formed therein, the openings being arranged in series spaced circumferentially of the conduits.

3. A gas separator comprising a conduit for the passage of gas having a section thereof jacketed, said jacketed section of the conduit being provided with a spirally extending series of openings and means for causing gas passing through said jacketed section of the conduit to move in contact with the walls of the conduit at said openings, comprising a worm having its outer edge continuously secured to the inner wall of the conduit immediately beyond the edge of the series of openings from the inlet end of the jacketed section of the conduit, said worm having its inner edge continuously attached to the outer surface of a tubular core, the end of said core corresponding to the inlet end of the jacketed section of the conduit being closed, said core at a point spaced from said closed end having a series of openings formed therein permitting communication between the interior of the conduit and the interior of said core.

4. A gas separator comprising a conduit for the passage of gas having a section thereof jacketed, said jacketed section of the conduit being provided with a spirally extending series of openings, means for causing gas passing through said jacketed section of the conduit to move in contact with the walls of the conduit at said openings and means for refrigerating the gases during a portion of their passage through the jacketed section of the conduit, comprising a spirally wound coil having the same pitch as the series of openings and supported within the conduit in substantially confronting relation to but spaced from the inner wall of the conduit at such series of openings.

5. A gas separator comprising a conduit for the passage of gas having a section thereof jacketed, said jacketed section of the conduit being provided with a spirally extending series of openings, means for causing gas passing through said jacketed section of the conduit to move in contact with the walls of the conduit at such openings, the space between said jacket and conduit being subdivided by partitions spaced longitudinally of the conduit into a plurality of chambers and an outlet communicating with each chamber, the bottom wall of the conduit of each chamber having a plurality of longitudinally spaced longitudinally extending openings formed thereby, the openings being arranged in series spaced circumferentially of the conduits, the openings of adjacent series being staggered with relation to one another, said openings being of such length that the openings of each series overlap the adjacent ends of openings of the adjacent series.

6. The method of separating gases into their constituents with respect to density consisting in causing the gas to move in a spiral path and operate against a wall during this movement and providing the wall with spirally arranged series of openings through which the components of the gas may pass segregating the openings of the wall into groups and placing each group in communication with an outlet.

In testimony whereof we affix our signatures.

OLIVER W. VAN PETTEN.
ROBERT DEMING.